(12) United States Patent
Casper

(10) Patent No.: US 6,358,605 B1
(45) Date of Patent: Mar. 19, 2002

(54) LABEL FOR USE ON RUBBER PRODUCTS

(75) Inventor: Daniel J. Casper, Colgate, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 09/501,774

(22) Filed: Feb. 10, 2000

(51) Int. Cl.$^7$ .............................. B32B 7/00; B32B 3/00; B32B 33/00; B42F 15/00

(52) U.S. Cl. .................... 428/343; 428/141; 428/156; 428/161; 428/172; 428/339; 428/40.1; 428/353; 428/354; 283/81

(58) Field of Search .................... 428/34.3, 40.1, 428/141, 156, 161, 172, 339, 35.3, 35.4; 283/81

(56) References Cited

U.S. PATENT DOCUMENTS

| | | | |
|---|---|---|---|
| 4,098,935 A | 7/1978 | Knudsen | 428/40 |
| 4,252,589 A | 2/1981 | Hayakawa et al. | 156/116 |
| 4,256,159 A | 3/1981 | Williams | 152/353 R |
| 5,160,383 A | 11/1992 | Gartland et al. | 152/510 |
| 5,286,783 A | 2/1994 | Hisaki et al. | 524/510 |
| 5,358,772 A | 10/1994 | Nakagawa et al. | 428/148 |
| 5,371,153 A | 12/1994 | Kuribayashi et al. | 525/423 |
| 5,408,007 A | 4/1995 | Mizuno et al. | 525/305 |
| 5,527,407 A | 6/1996 | Gartland et al. | 156/64 |
| 5,565,507 A | 10/1996 | Marco et al. | 523/413 |
| 5,571,352 A * | 11/1996 | Disselbeck | 428/166 |
| 5,700,623 A | 12/1997 | Anderson et al. | 430/256 |
| 5,709,918 A | 1/1998 | Kimijima et al. | 428/40.1 |
| 5,863,987 A * | 1/1999 | Nakamura et al. | 525/92 D |
| 5,891,567 A | 4/1999 | Kim et al. | 428/364 |
| 5,891,938 A | 4/1999 | Williams | 524/100 |

FOREIGN PATENT DOCUMENTS

| | | | |
|---|---|---|---|
| DE | 3347400 | 7/1985 | |
| GB | 2018718 | 10/1979 | |
| JP | 52040100 | 3/1977 | G09F/3/10 |
| JP | 78029595 | 8/1978 | G09F/3/10 |
| JP | 57054979 | 4/1982 | G09K/0/02 |
| JP | 60187539 | 9/1985 | B29D/30/00 |
| JP | 61027711 | 2/1986 | B60C/13/00 |
| JP | 62016111 | 1/1987 | B29C/35/02 |
| JP | 5096914 | 4/1993 | B60C/13/00 |
| JP | 5290199 | 11/1993 | G06K/7/10 |
| JP | 6028530 | 2/1994 | G06K/19/06 |
| JP | 6312604 | 11/1994 | B60C/13/00 |
| JP | 7266811 | 10/1995 | B60C/13/00 |
| JP | 7306642 | 11/1995 | G09F/3/02 |
| JP | 9068924 | 3/1997 | G09F/3/02 |
| JP | 10143073 | 5/1998 | G09F/3/10 |
| JP | 10187044 | 7/1998 | G09F/3/02 |
| JP | 10222069 | 8/1998 | G09F/3/02 |

* cited by examiner

Primary Examiner—P. Hampton-Hightower
(74) Attorney, Agent, or Firm—Whyte Hirschboeck Dudek SC

(57) ABSTRACT

Labels comprising (i) a film substrate, e.g., polyester, (ii) a primer layer, e.g., resorcinol-formaldehyde resin, and (iii) a pressure sensitive adhesive, e.g., a natural or synthetic rubber based adhesive, are improved by including a second primer layer of chlororesorcinol between the film substrate and the first primer layer.

12 Claims, 1 Drawing Sheet and polyethylene napathalate. The film made from the heat-

LABEL FOR USE ON RUBBER PRODUCTS

FIELD AND BACKGROUND OF THE INVENTION

The invention relates to labels for use on rubber products. In one aspect, the invention relates to labels comprising a polyester film while in another aspect, the invention relates to a label comprising a polyester film in combination with a primer for promoting adhesion of the label to a rubber substrate. In yet another aspect, the invention relates to methods of making and using such labels.

U.S. Pat. No. 5,709,918 to Kimijima and Sakashita, the disclosure of which is incorporated herein by reference, teaches an information-indicating label for use in the production of tires. The label consists essentially of a single layer polyester film substrate, e.g., polyethylene terephthalate (PET), in combination with a pressure sensitive adhesive, e.g., any of the natural or synthetic rubber-based adhesives. To promote the adhesive strength between the substrate and the pressure sensitive adhesive, a primer layer is included between the substrate and adhesive. Examples of appropriate primer layers include resorcinol-formaldehyde resin or resorcinol-formaldehyde latex resin.

While these labels are generally effective for their intended use, a demand remains for labels of this general construction but with an improved adhesiveness to rubber substrates, particularly green rubber such as tires prior to vulcanization.

SUMMARY OF THE INVENTION

According to this invention, a label comprising (i) a first primer layer of resorcinol-formaldehyde one side of which is in intimate contact with (ii) a film substrate, and the other side of which is in intimate contact with (iii) a pressure sensitive adhesive is improved by inserting between the film substrate and the primer layer (iv) a second primer layer comprising, in one embodiment, a condensation product of chlorophenol, resorcinol and a methylene donor, e.g., formaldehyde. The addition of this second primer layer significantly increases the peel adhesion of the label to a rubber substrate, particularly a green rubber substrate, e.g., a tire prior to vulcanization, at both ambient and elevated temperatures.

DETAILED DESCRIPTION OF THE PREFERRED EMBODIMENTS

Figure 1:
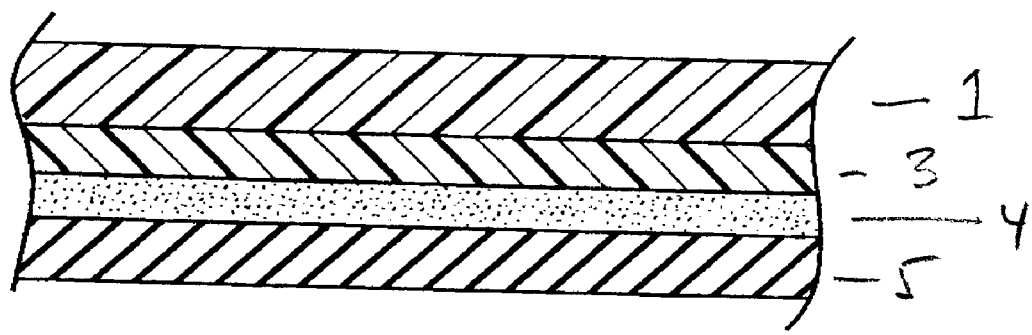
FIG. 1 is an enlarged, cross-sectional view that shows an embodiment of a prior art label.

In FIG. 1, film substrate 1 is prepared from any heat-resistant resin. By "heat-resistant" is meant a resin with a melting point (Tm) or thermal distortion temperature (softening point) of about 160 C. or greater, preferably of about 180 C. or greater. Representative resins include polyester, ABS, polyarylate, polycarbonate, polyamide, polyimide, polyamidoimide, polyacetal, polyphenylene oxide, polysulfone, polyethersulfone, polyphenylene sulfide, polyether ether ketone, and polymers or polymer alloys containing one or more of these materials. The preferred heat-resistant resin is polyester, and preferred polyesters include PET, polybutylene terephthalate and polyethylene napathalate. The film made from the heat-resistant resin can be single or multilayered, filled (e.g., with a pigment or dye) or unfilled, smooth or rough surfaced (as described in U.S. Pat. No. 5,709,918), and/or microcavitated or not. Microcavitated films are typically prepared by introducing air into the resin during film extrusion, and such films generally exhibit lower specific gravity and improved print receptivity as compared to non-microcavitated films. Preferably the substrate film is single-layered, unfilled, microcavitated and has a surface roughness with an arithmetical mean deviation of between 0.5 and 5 microns as determined by JIS B 0601. The thickness of this substrate film layer can vary to convenience, but is typically between about 0.25 and about 7 mil, preferably between about 3 and about 5 mil.

One side of the film substrate, the side distal or most removed from the rubber substrate to which the label is attached, typically bears information indicia (not shown) that can be applied in any manner using any acceptable material, e.g., heat-resistant ink. Indicia can be applied by any of a number of different methods, such as thermal transfer, ink jet, digital offset, dot matrix, laser imaging and the like. For labels applied to tires prior to vulcanization, the information is typically in the form of a bar code supplemented with words and numbers in any appropriate language. These information indicia may or may not be covered with a protective coating, or over-laminated with a clear film.

Layer 3 of FIG. 1 is in intimate contact with layer 1. As here used, "in intimate contact" means that the layers are in adhering contact with one another, e.g., as a coating is in contact with its substrate, with the understanding that the strength of the contact or, in other words, the strength of the adhesiveness of one layer to the other, will vary with the composition of the layers and the method of their joining.

Layer 3 comprises a primer, which increases the adhesive strength of substrate layer 1 to pressure adhesive layer 4 (the mechanism of which is not fully understood). Conventional primers for bonding polyester to rubber include glycidyl ether epoxy/phenol-blocked isocyanates (which require heating to 220 C. or greater to unblock the isocyanate), isocyanurates, and condensation products of (i) resorcinol and formaldehyde, or (ii) resorcinol, formaldehyde and chlorophenol (commonly known as chlororesorcinol). Preferably the primer layer comprises a mixture or blend of resorcinol, formaldehyde (or a source of formaldehyde) and styrene butadiene vinyl pyridine latex solution (commonly known as resorcinol-formaldehyde latex resin).

The condensation product of resorcinol and formaldehyde is typically made by reacting resorcinol in an alkaline solution with any suitable methylene donor, e.g., formaldehyde or paraformaldehyde. However, since formaldehyde and paraformaldehyde are undesirable materials with which to work due to their toxicity, a preferred primer synthesis employs a precondensed solution of resorcinol, such as those commercially available from Inspec Corporation under the trademark Penacolite, and a source of formaldehyde, such as hexamethylene tetramine (HMT). Upon heating, the HMT liberates formaldehyde which in turn reacts with the resorcinol. Typical levels of HMT are from greater than zero to about 3, preferably to about 2, parts per 10 parts of Penacolite R2170. Alternatively, Penacolite resins can be incorporated neat into the primer.

In one embodiment, primer layer 3 further comprises chlororesorcinol which improves the wetting properties of the primer. In this embodiment, the chlororesorcinol is present in an amount of about 4–30, preferably 7–15, parts per 100 parts of resorcinol-latex solution.

The thickness of primer layer 3 can also vary to convenience, but is typically between about 0.05 and about 0.6 mil, preferably between about 0.1 and about 0.3 mil.

Pressure sensitive adhesive layer 4 is applied to the surface of layer 3 that is opposite the surface of layer 3 in contact with layer 1 such that layer 4 is in intimate contact with layer 3. Many conventional pressure sensitive adhesives can be used in the practice of this invention, but the preferred adhesives are the natural and synthetic rubbers either alone or in combination with one another. Here too, the thickness of the pressure sensitive adhesive layer can vary to convenience, but it is typically between about 0.5 and about 3 mil, preferably between about 1 and about 1.5 mil.

The construction of release liner 5 is not particularly important to the practice of this invention and its purpose, of course, is to protect the pressure sensitive adhesive until the label is ready for application to a rubber substrate. Examples of materials that can be used for the liner include glassine paper, laminated paper, polyester film and polypropylene film, preferably each of which has been subjected to a coating of silicone.

Figure 2:
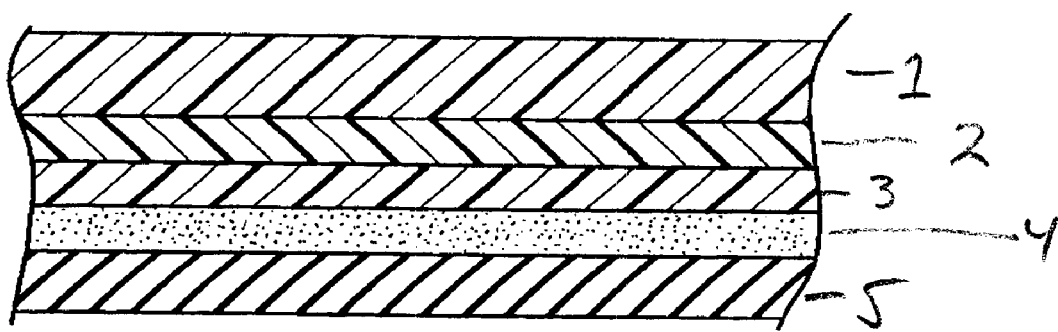
FIG. 2 is an enlarged, cross-sectional view that shows an embodiment of a label of this invention.

In FIG. 2 an embodiment of this invention is shown. Like numerals are used to represent like layers in both drawings. FIG. 2 differs from FIG. 1 by the presence of second primer layer 2. This second primer layer is located between and is in intimate contact with both film substrate layer 1 and primer layer (now first primer layer) 3. The second primer layer comprises chlororesorcinol. Several grades of chlororesorcinol are commercially available from Nagase Chemical (e.g., Denabond, Denabond AL and Denabond AF) and Swan Chemical (Cassabond E).

The chlororesorcinol can be employed neat or, preferably, in combination with one or more polar organic solvents to improve the wetting of the polyester film. Illustrative of such solvents are methanol, ethanol, n-propyl alcohol, isopropyl alcohol (a preferred solvent due to its relatively high vapor pressure), and dimethyl sulfoxide (another preferred solvent because not only does it improve wetting, but it is also promotes the adsorption of the chlororesorcinol into the polyester film). If a solvent is used, then it is usually present in an amount between about 5 and about 25, preferably between about 10 and about 20, percent by weight based on the weight of the mixture of chlororesorcinol and solvent.

The second primer layer can be of any appropriate thickness, typically between about 0.02 and about 0.1 mil and preferably between about 0.03 and about 0.05 mil. The presence of this second primer layer significantly enhances peel adhesion at both ambient and elevated temperatures.

The labels of this invention are prepared in a manner similar to those labels known in the art. The film substrate is prepared in any conventional manner, e.g., cast or blow molding, in one or multiple layers from the heat-resistant resin and then coated, again in any conventional manner, with the chlororesorcinol primer. After drying, the chlororesorcinol layer is coated with a resorcinol-formaldehyde or resorcinol-formaldehyde latex (preferably comprising chlororesorcinol) that is then dried and itself coated with a pressure sensitive adhesive. After the pressure sensitive adhesive is appropriately dried, a release liner is applied. Information indicia can be applied to the uncoated side of the film substrate before or after any of the coating steps, but typically it is applied after the release liner covers the pressure sensitive adhesive.

The labels of this invention are used in the conventional method of removing the release liner and the applying with moderate pressure the pressure sensitive adhesive side the label to a rubber substrate. The labels of this invention are particularly useful with "green" rubber products, i.e., rubber products prior to vulcanization. These products, e.g., tires, hoses, mats, belts, air springs and the like, often require tracking through the manufacturing process, but the process of vulcanization can have an adverse effect on the peel adhesion of the label to the product. With the labels of this invention, the peel adhesion is often greater after vulcanization than prior to vulcanization.

SPECIFIC EMBODIMENTS

The following examples are illustrative of specific embodiments of this invention and unless indicated to the contrary, all parts and percentages are by weight.

Examples 1–6

Procedure

Six examples were performed to evaluate the contribution of a separate chlororesorcinol layer to the adhesiveness of a tracking label to a rubber substrate.

Examples 1–3 were controls that contained only one primer layer, and that layer was composed of a blend of chlororesorcinol and resorcinol-formaldehyde latex solution (CRFL). The label had a configuration of FIG. 1 in which the film substrate was a single layer of 4 mil PET commercially available under the trademark Toyobo GS-2311. The CRFL layer (No. 3 in FIG. 1) was compounded from the following ingredients:

Deionized Water 32.4 g
50% NaOH Soln[1] 0.4 g
Penacolite R2170[2] 3.33 g
Hexamethylene tetramine 0.576 g
Gentac 118 (SB-VP Latex)[3] 31.7 g
Denabond[4] 30.0 g

[1]0.005 mol of NaOH, or 0.27 mol % based on the weight of water.
[2]Partially precondensed resorcinol-formaldehyde resin (75% in water) manufactured by Inspec Corporation.
[3]Styrene-butadiene vinyl pyridine latex solution manufactured by Omnova Solutions, Inc.
[4]Chlororesorcinol available from Nagase Chemical.

This CRFL solution was then cast onto the surface of the polyester film using a No. 7 wire wound rod to provide a layer thickness of 0.2 mil.

The adhesive layer (No. 4 in FIG. 1) was a standard rubber-based adhesive compounded from the following ingredients:

Rosin Ester Tackifier 185.2 g
Natural Rubber 386 g
Styrene Butadiene Rubber 115.8 g
Antioxidants 2.3 g
Zinc Oxide 77.2 g
Dipentamethylene Thiuram Hexasulfide 3.859 g The adhesive was coated onto the CRFL layer using a 10 mil gapped Bird bar, which, upon drying, gave a final coating thickness of about 1 mil.

The release liner (No. 5 in FIG. 1) was a 2 mil PET silicone coated film.

Examples 4–6 report embodiments of this invention. In these examples, the CR layer was prepared from a 5% solution of chlororesorcinol made by mixing 25 g of Denabond with 65 g of deionized water and 10 g of isopropyl alcohol. This dilute solution was coated onto a 4 mil polyester face sheet using a No. 7 wire wound rod to produce a layer thickness (No. 2 in FIG. 2) of 0.04 mil.

For Control Examples 1–3, the CRFL layer was cured for 5 minutes at 177, 191 and 205 C., respectively. The adhesive was then dried for 5 minutes at 150 C. in each of these Examples.

For Examples 4–6, the CR layer was cured for 5 minutes at 177, 191 and 205 C., respectively, but in these examples, the CRFL layer and the adhesive layer were each dried at 150 C. for 5 minutes.

Finished labels were adhered to a 7.5×7.5×0.65 centimeter (cm) pieces of uncured sidewall tire compound. The samples were pressed between two sheets of release liner for 10 minutes at 177° C. under 1 ton of pressure on a 12.7 cm hydraulic ram. Labels were tested for adhesion to cured rubber approximately one hour after pressing (i.e., cold peel).

Results

Table I summarizes the results of these six examples.

TABLE I

Comparative Peel Adhesion Results of PET Labels Comprising One and Two Primer Layers

| Example | Primer Construction | Cure Temp. for First Primer Pass | Force Kg/cm | Force N/cm |
|---|---|---|---|---|
| 1 | CRFL | 177° C. | 0.24* | 2.35 |
| 2 | CRFL | 191° C. | 0.14* | 1.37 |
| 3 | CRFL | 205° C. | 0.19* | 1.86 |
| 4 | CR & CRFL | 177° C. | 1.80** | 17.65 |
| 5 | CR & CRFL | 191° C. | 3.45*** | 33.83 |
| 6 | CR & CRFL | 205° C. | 3.94** | 38.64 |

*Failure mode was from PET/CRFL interface.
**Failure mode was rupture of PET film.
***Failure mode was from CRFL/Adhesive interface.

Peel adhesions were done on a Sintech material testing machine using approximately a 90° peel angle. All tests were conducted at a speed of 50 mm/min. In addition, numbers reported in Table 1 are peak load values. The results reported in Table 1 indicate that the inclusion of a separate CR layer significantly improves adhesion. Moreover, these results show that mere inclusion of chlororesorcinol into the CRFL layer does not improve the adhesion of the label to the rubber substrate.

Although the invention has been described in considerable detail, this detail is for the purpose of illustration. Many variations and modifications can be made on the invention as described above without departing from the spirit and scope of the invention as described in the appended claims.

What is claimed is:

1. In a label comprising:
   A. A film substrate;
   B. A first primer layer comprising at least one of a resorcinol-formaldehyde or resorcinol-formaldehyde latex resin in intimate contact with one surface of the film substrate; and
   C. A pressure sensitive adhesive in intimate contact with the surface of the resin which is opposite the surface of the resin which is in intimate contact with the film substrate,
the improvement comprising a second primer layer comprising chlororesorcinol located between the film substrate and the first primer layer such that one surface of the second primer layer is in intimate contact with the film substrate and the other surface of the second primer layer is in intimate contact with the first primer layer.

2. The label of claim 1 in which the film substrate comprises a polyester, the first primer layer comprises resorcinol-formaldehyde latex, and the pressure sensitive adhesive comprises a natural or synthetic rubber-based adhesive.

3. The label of claim 2 in which the first primer layer further comprises chlororesorcinol.

4. The label of claim 3 in which the film substrate is microcavitated.

5. The label of claim 4 in which the film substrate is polyethylene terephthalate.

6. The label of claim 5 in which the thickness of the film substrate is between about 0.25 and about 7 mil, the thickness of the first primer layer is between about 0.05 and about 0.6 mil, the thickness of the second primer layer is between about 0.02 and about 0.1 mil, and the thickness of the pressure sensitive adhesive is between about 0.5 and about 3 mil.

7. The label of claim 1 in which the second primer layer is cured at a temperature of at least about 150° C.

8. In a process of making a label comprising:
   A. A film substrate having opposing first and second surfaces;
   B. A first primer layer comprising at least one of a resorcinol-formaldehyde or resorcinol-formaldehyde latex resin in intimate contact with one surface of the film substrate; and
   C. A pressure sensitive adhesive in intimate contact with the surface of the resin that is opposite the surface of the resin which is in intimate contact with the film substrate,
the improvement comprising inserting between the film substrate and the first primer layer a second primer layer comprising chlororesorcinol such that one surface of the second primer layer is in intimate contact with the film substrate and the other surface of the second primer layer is in intimate contact with the first primer layer.

9. The process of claim 8 in which the second primer layer is cured at a temperature of at least about 150° C.

10. The process of claim 9 in which the first primer layer further comprises chlororesorcinol.

11. The label of claim 1 adhered to a rubber substrate.

12. The label of claim 1 adhered to the sidewall of a tire prior to subjecting the tire to vulcanization.

* * * * *

UNITED STATES PATENT AND TRADEMARK OFFICE
CERTIFICATE OF CORRECTION

PATENT NO.    : 6,358,605 B1
DATED         : March 19, 2002
INVENTOR(S)   : Daniel J. Casper It is certified that error appears in the above-identified patent and that said Letters Patent is hereby corrected as shown below:

<u>Column 4,</u>
Line 47, delete "386 g" and replace it with -- 38.6 g --.

Signed and Sealed this

Eleventh Day of June, 2002

*Attest:*

JAMES E. ROGAN
*Attesting Officer*  *Director of the United States Patent and Trademark Office*